United States Patent
Kawai et al.

(10) Patent No.: US 7,284,937 B2
(45) Date of Patent: Oct. 23, 2007

(54) MACHINING APPARATUS

(75) Inventors: Tomohiko Kawai, Yamanashi (JP);
Kenzo Ebihara, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 11/524,399

(22) Filed: Sep. 21, 2006

(65) Prior Publication Data
US 2007/0086869 A1    Apr. 19, 2007

(30) Foreign Application Priority Data
Oct. 5, 2005    (JP)    ............................. 2005-292371

(51) Int. Cl.
*B23Q 35/127*    (2006.01)
*B23Q 35/00*    (2006.01)
*B23C 3/00*    (2006.01)

(52) U.S. Cl. .................. 409/81; 409/188; 409/121; 409/127; 318/578; 358/299; 358/3.3; 700/159; 700/161

(58) Field of Classification Search ................. 409/80, 409/81, 82, 83, 84, 85, 86, 91, 93, 121, 124, 409/126, 127, 207, 208, 210, 214, 183, 188; 318/578, 570, 572, 577; 700/159, 160, 161, 700/163; 358/3.3, 3.29
See application file for complete search history.

(56) References Cited

U.S. PATENT DOCUMENTS

| | | | | |
|---|---|---|---|---|
| 2,149,487 | A | * | 3/1939 | Zilberman et al. ............ 358/3.3 |
| 4,215,960 | A | * | 8/1980 | Tsuzuki ....................... 409/121 |
| 4,639,172 | A | * | 1/1987 | Kishi et al. .................... 409/80 |
| 4,956,786 | A | * | 9/1990 | Drummond et al. ......... 700/160 |
| 5,416,597 | A | * | 5/1995 | Mubaslat .................... 358/3.29 |
| 5,426,356 | A | * | 6/1995 | Matsuura et al. ............ 318/578 |
| 6,747,750 | B1 | * | 6/2004 | Fangmeyer .................. 358/1.1 |
| 6,775,586 | B2 | * | 8/2004 | Shibata et al. .............. 700/189 |
| 7,082,349 | B2 | * | 7/2006 | Kawai et al. ................ 700/161 |
| 7,128,504 | B2 | * | 10/2006 | Wu .............................. 409/81 |

* cited by examiner

*Primary Examiner*—Dana Ross
(74) *Attorney, Agent, or Firm*—Staas & Halsey LLP (57) ABSTRACT

A pulse generation means that generates a pulse each time an XY movable member moves linearly by a certain amount relative to a base is provided. A workpiece and a light and dark pattern member are provided on the base. A tool, a light and dark pattern scanning sensor that scans the light and dark pattern and outputs a scanning signal, and a cutting means that moves the tool with respect to the workpiece in a cutting depth direction, orthogonal to the linear motion direction, are provided on the XY movable member. While the XY movable member moves relative to the base, the tool is moved by the cutting means in accordance with a logical AND operation performed on the scanning signal from the light and dark pattern scanning sensor and the pulse from the pulse generation means to perform machining.

10 Claims, 6 Drawing Sheets

(a) SCALE SIGNAL (b) LIGHT AND DARK PATTERN SCANNING SIGNAL (c) AND OUTPUT FROM AND OPERATION UNIT 16

(d) RESPONSE OF PIEZOELECTRIC DEVICE 14

Y DIRECTION

X DIRECTION

FIG. 8

(a) SCALE SIGNAL (b) LIGHT AND DARK PATTERN SCANNING SIGNAL (c) AND OUTPUT FROM AND OPERATION UNIT 16

(d) RESPONSE OF PIEZOELECTRIC DEVICE 14

(a) SCALE SIGNAL (b) LIGHT AND DARK PATTERN SCANNING SIGNAL (c) AND OUTPUT FROM AND OPERATION UNIT 16

(d) MACHINING PULSE

FIG. 12A

PART HAVING A LIGHT GRADATION

FIG. 12B

PART WITH SMALL DIMPLES

MACHINING APPARATUS

BACKGROUND OF THE INVENTION

1. Field of the Invention

This invention relates to a precision machine tool and to a machining apparatus that performs high precision machining.

2. Description of the Related Art

To create a die for molding a light guide plate of the type used for backlighting in a liquid crystal display, tens to hundreds of thousands of minute dimples (hemispherical hollows) need to be machined on the surface of a workpiece. The dimples have a diameter of tens to hundreds of micrometers and are conventionally created one by one by cutting with a machine tool. To perform the cutting, it is necessary to repeat a procedure that includes high speed driving of a small-diameter ball end mill, horizontal positioning of the X and Y axes of the machine tool, and cutting in the Z-axis direction to create a hemispherical dimple. Sometimes the machining is done by a laser machine, in which case some tens of dimples can be machined per second.

A patent application for an invention related to a machining apparatus that performs machining in accordance with a light and dark pattern was filed on Jul. 6, 2005 (Japanese patent application No. 2005-203338). This machining apparatus has a linear driving means that moves a movable part linearly, a light and dark patterned member having a light and dark pattern that indicates machining information, and a sensor that moves relative to the light and dark pattern in synchronization with the movement of the movable part and outputs a light and dark pattern scanning signal. The movable part has a tool and a cutting means that changes the cutting depth of the tool according to the signal from the sensor. As the movable part and the sensor move, the sensor scans the light and dark pattern and the cutting means varies the cutting depth according to the signal received from the sensor, so that machining is performed in accordance with the light and dark pattern.

No publicly available documentation of the use of a light and dark pattern in a method of performing intermittent machining such as the machining of a die for a light guide plate could be found.

Machining hundreds of thousands of dimples on a light guide plate one by one by a cutting process is inefficient because it takes too much time. A problem in high speed machining with a small-diameter ball end mill is that the ball end mill is easily broken. If it were possible to perform a periodic cutting process by advancing a non-rotary tool such as a diamond cutting tool continuously in the horizontal direction, the machining time could be reduced by eliminating the dwell time for each cut.

Ordinary machine tools are limited, however, to machining at most a few dimples per second due to the limited speed of the numerical controller or the limited response speed of the machine tool. When a laser machine is used, the machining speed becomes higher, but this machining method uses a melting process, so the machining profile is less precise than in a cutting process. In both cutting and laser machining, if a position for each dimple is specified in a program, the size of the program becomes very large, including hundreds of thousands of lines, even if only one line is required for each dimple.

SUMMARY OF THE INVENTION

An object of the present invention is to provide a machining apparatus that can perform microfabrication such as dimple machining on a die for a light guide plate rapidly and precisely at an exact pitch.

The machining apparatus according to the present invention comprises a linear driving means that moves a first member linearly in a first direction relative to a second member opposite the first member, and a pulse generation means that generates a pulse each time the first member moves a certain amount relative to the second member. Furthermore, an area for placing a workpiece is provided on the first (or second) member, a light and dark member having a light and dark pattern indicating machining information is placed on the first (or second) member, and a light and dark pattern scanning sensor that scans the light and dark pattern and outputs a scanning signal, a tool for machining the workpiece, a cutting means that makes the tool cut into the workpiece in a direction orthogonal to the first direction, and a cutting means driving section that drives the cutting means are provided on the second (or first) member. The cutting means driving section machines the workpiece by having the cutting means operate the tool according to the output of a logical AND operation performed on the scanning signal from the light and dark pattern scanning sensor and pulses from the pulse generation means while the first member moves relative to the second member.

The cutting means driving section may include a machining pulse generator that generates convex machining pulses, makes the machining pulse generator generate the machining pulses in accordance with the output of the logical AND operation, and performs machining by having the cutting means vary the cutting depth of the tool according to the machining pulses. The machining pulse generator may have means for adjusting the pulse width of the machining pulses to be generated manually or according to the feed rate of the movable member.

The cutting means may include a piezoelectric device and move the tool in the cutting depth direction by expanding or compressing the piezoelectric device according to a magnitude of an applied voltage The machining process performed by the cutting means may be dimple machining.

The first member may perform a reciprocating motion in the first direction with respect to the second member, the tool may machine the workpiece while the first member moves on a forward path, and the tool may retract from the workpiece while the first member moves on a backward path.

A second linear driving means that moves the first member relative to the second member in a second direction orthogonal to both the first direction and the cutting depth direction of the tool may be provided. A third linear driving means that moves the first member relative to the second member in a third linear direction aligned with the cutting depth direction of the tool may be provided.

The pulse generation means may have a linear scale marked with scales spaced at a constant pitch and a linear scale sensor that outputs a pulse each time a scale on the linear scale is scanned, the linear scale being disposed on the first (or second) member and the linear scale sensor being disposed on the second (or first) member. The pulse generation means may be an encoder disposed on a feed axis of the linear driving means.

Being structured as above, the present invention enables rapid and precise micromachining at an exact pitch with only a light and dark pattern.

BRIEF DESCRIPTION OF THE DRAWINGS

The purposes and advantages of the present invention, including those described above, will be clarified by reference to the attached drawings in combination with the description of the embodiments presented below. Of these drawings.

DETAILED DESCRIPTION OF THE PREFERRED EMBODIMENTS

First, a general description of an embodiment of the inventive machining apparatus will be given with reference to FIG. 1.

The machining apparatus comprises a first member and a second member that are vertically opposite to each other, and a linear driving means that linearly moves the first member relative to the second member. In the machining apparatus in this embodiment, the second member (base 1) is fixed, the first member 2 (hereinafter referred to as XY movable member) is movable in mutually orthogonal X-axis and Y-axis directions with respect to the base 1, as shown in FIG. 1, and is moved in these directions by linear driving means. The linear driving means includes a first linear driving means 3 (hereinafter referred to as X-axis driving means) that drives the XY movable member 2 in one direction (the X-axis direction) and a second driving means (hereinafter referred to as Y-axis driving means) that moves a movable member 4 (hereinafter referred to as Y movable member) on which the XY movable member 2 is mounted in a direction (the Y-axis direction) orthogonal to the X-axis with respect to the base 1.

The Y-axis driving means (not shown) that moves the Y movable member 4 on which the XY movable member 2 is mounted on the Y direction with respect to the base 1 and the X-axis driving means 3 that drives the XY movable member 2 in the X-axis direction each have a rotary servo motor and a conversion mechanism such as a ball screw/nut mechanism that converts the rotational motion to linear motion, or have a linear motor.

As described above, the XY movable member 2 is driven by the X-axis driving means 3 in the X-axis direction with respect to the base 1 and the X-axis driving means 3 mounted on the Y movable member 4 that is driven by the Y-axis driving means in the Y-axis direction, so the XY movable member 2 is movable in both the X-axis and Y-axis directions with respect to the base 1.

The workpiece 5 to be machined is attached to a top surface of the base 1 and the XY movable member 2 is stationed opposite the surface to which the workpiece 5 is attached. A light and dark pattern member 6 with a light and dark pattern indicating machining information is disposed on the top surface of the base 1 beside the workpiece 5.

Figure 1:
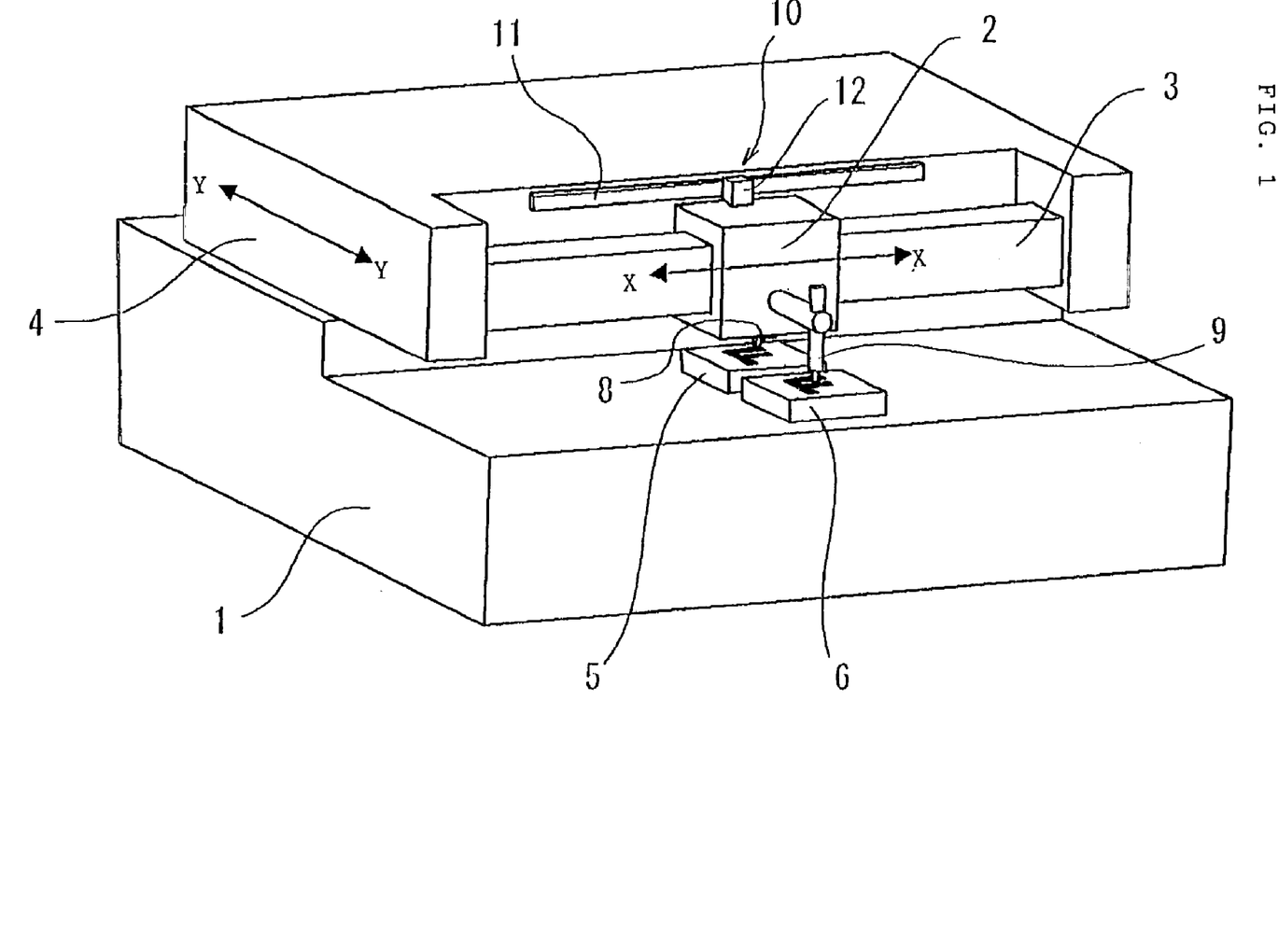
FIG. 1 is a perspective view schematically illustrating an embodiment of a machining apparatus according to the present invention.
Figure 2:
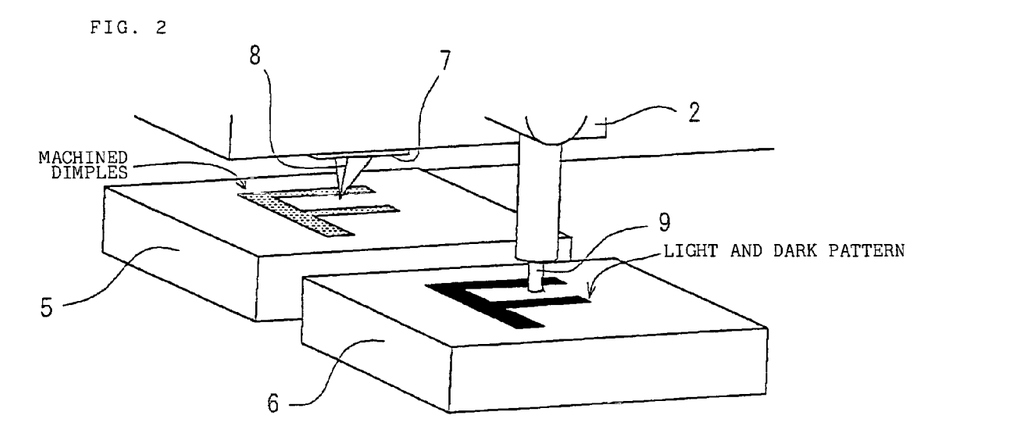
FIG. 2 is an enlarged view illustrating the main elements of the machining apparatus in FIG. 1.

FIG. 2 is an enlarged view of the main elements of the machining apparatus in FIG. 1.

A tool 8 is arranged via a cutting means 7 underside of the XY movable member 2 opposite to the workpiece 5. A light and dark pattern scanning sensor 9, which scans the light and dark pattern of the light and dark pattern member 6 disposed beside the workpiece 5 and outputs a scanning signal corresponding to the brightness of the light and dark pattern, is disposed on the XY movable member 2. A photoelectric sensor with a fast response is suited for the light and dark pattern scanning sensor 9; if outgoing light is focused by a lens to increase the scanning resolution, a finer light and dark pattern can be scanned.

The machining apparatus also has a pulse generation means 10 that generates a pulse each time the XY movable member 2 moves a certain amount relative to (the Y movable member 4, which halts its movement with respect to) the base 1. In this embodiment, the pulse generation means 10 has a linear scale 11 with scales spaced at a constant pitch and a linear scale sensor 12 that outputs a pulse as a scale signal each time a scale on the linear scale 11 is scanned. The linear scale 11 is attached to the Y movable member 4 in parallel with the movement direction (X-axis direction) of the XY movable member 2. The linear scale sensor 12 is mounted on the XY movable member 2.

The cutting member 7 cuts the workpiece 5 by moving the tool 8 in a direction (Z-axis direction) orthogonal to both the direction of movement (X-axis direction) of the XY movable member 2 and the direction of movement (Y-axis direction) of the Y movable member 4, based on the output of a logical AND operation performed on the scanning signal from the light and dark pattern scanning sensor 9 and the scale signal (pulse) from the pulse generation means 10 (linear scale sensor 12). In machining for hemispherical dimples, a rounded cutting tool with a tip radius of several tens of micrometers is used as the tool 8.

Figure 3A:
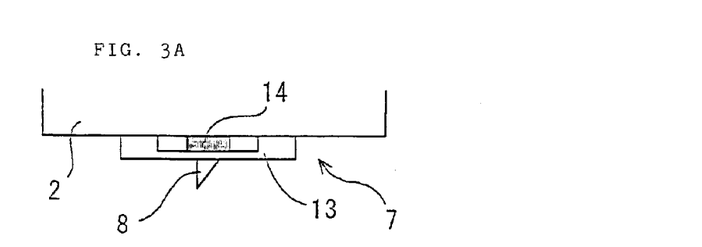
FIGS. 3A and 3B illustrates the cutting means in FIG. 2 in more detail.
Figure 3B:
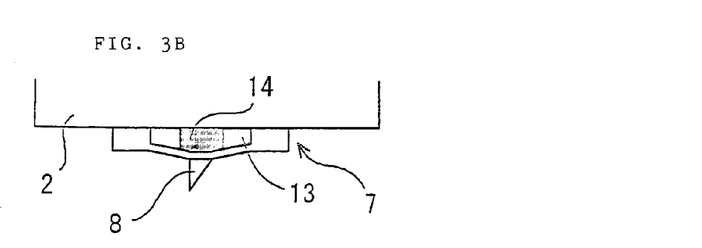

The cutting means 7 in FIG. 2 will be described in detail with reference to FIGS. 3A and 3B.

The tool 8 is attached via a leaf spring 13 to a surface of the XY movable member 2 that is opposite to the workpiece 5. A piezoelectric device 14 is installed between the leaf spring 13 and the XY movable member 2 so as to expand or compress the leaf spring 13. When a voltage is applied to the piezoelectric device 14 in the state in FIG. 3A, the piezoelectric device 14 extends as shown in FIG. 3B in accordance with the voltage, pushes the leaf spring 13, moves the tool 8 in the depth cutting direction (Z-axis direction), and cuts the workpiece 5; accordingly, the workpiece 5 is machined as the XY movable member 2 travels in the X-axis direction,.

The tool 8 is not directly attached to the piezoelectric device 14, but is attached to the leaf spring 13, so the force applied to the tool 8 is not directly transferred to the piezoelectric device 14. Therefore, the piezoelectric device 14, which is vulnerable to damage from external forces applied in any direction except the direction in which the piezoelectric device 14 is compressed, is protected by the leaf spring 13.

The X-axis driving means 3 makes the XY movable member 2 repeat a simple reciprocating motion in the X-axis direction. During movement of the XY movable member 2, a cutting means driving section that drives the cutting means 7 performs a logical AND operation on the scanning signal from the light and dark pattern scanning sensor 9 and a pulse signal from the pulse generation means 10 and moves the tool 8 through the cutting means 7, based on the output of the logical AND operation, to perform cutting.

The motion of the tool 8 will be described with reference to FIG. 4.

Figure 4:
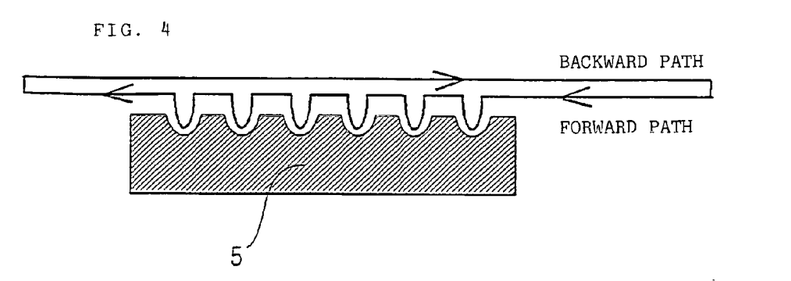
FIG. 4 illustrates the motion of the tool in FIG. 2.

In FIG. 4, the XY movable member 2 moves left and right (in the X-axis direction) and the tool 8 moves up and down (in the Z-axis direction) when driven by the cutting means 7. The feed of the tool 8 in the X-axis direction and the motion of the tool 8 in the Z-axis direction by the piezoelectric device 14 are combined so that the tool 8 moves on a continuous dimple machining path as shown in FIG. 4, machining as it moves. In this embodiment, the XY movable member 2 machines the workpiece 5 via the tool 8 by driving the piezoelectric device 14 during movement in the positive X-axis direction (on a forward path), and the XY movable member 2 retracts the tool 8 from the workpiece 5 by stopping the driving of the piezoelectric device 14 when moving in the negative X-axis direction (on a backward path), allowing the tool 8 to return to a position distant from the workpiece 5 by the return force of the leaf spring 13. Although the forward path (the path of motion used when the cutting means 7 is driven) and backward path (the path of motion used when the cutting means 7 is not driven) in the X-axis direction of the XY movable member 2 (tool 8) are shown separately in FIG. 4, this is for the sake of simplicity; when the cutting means 7 does not operate, both paths are basically the same.

A first example of the cutting means driving section for driving the cutting means 7 will be described with reference to the main element block diagram in FIG. 5.

In the present invention, the scanning signal from the light and dark pattern scanning sensor 9 is used to indicate an area to be machined. As an example, it will be assumed that the light and dark pattern is a simple white and black pattern, a black section in the light and dark pattern indicating an area to be machined, and a white section in the light and dark pattern indicating an area not to be machined. In the present invention, the pulse (scale signal from the linear scale sensor 12 in the above example) from the pulse generation means 10 is used to indicate a position at which machining is performed. Accordingly, machining is performed by the tool 8, which is moved by the cutting means 7 based on the logical AND of the scanning signal from the light and dark pattern scanning sensor 9 and the pulse signal from the pulse generation means 10.

The cutting means driving section 15 has an AND operation unit 16 that performs the logical AND operation on the scanning signal from the light and dark pattern scanning sensor 9 and the pulse signal (scale signal) from the pulse generation means 10 and outputs an AND signal, another AND operation unit 17 that receives the output (AND output) from the AND operation unit 16 and a driving direction signal for the XY movable member 2 that performs the machining and outputs the logical AND of the received signals as a driving signal, and a piezoelectric amplifier 18 that drives the piezoelectric device 14 in accordance with the driving signal given by the AND operation unit 17.

In this first example of the cutting means driving section, the workpiece 5 is machined when the XY movable member 2 moves in the positive X-axis direction (on the forward path), so a signal generated when the XY movable member 2 moves in the positive X-axis direction (forward path) is input to the AND operation unit 17. As this signal, a driving direction command signal for the X-axis driving means output from a numerical controller or the like that controls the machining apparatus may be used. The AND operation unit 17 outputs the AND output from the AND operation part 16 to the piezoelectric amplifier 18 only when the XY movable member 2 moves in the positive X-axis direction to control the piezoelectric amplifier 18.

The timing at which the tool is driven will be described with reference to the FIG. 6.

Figure 6:
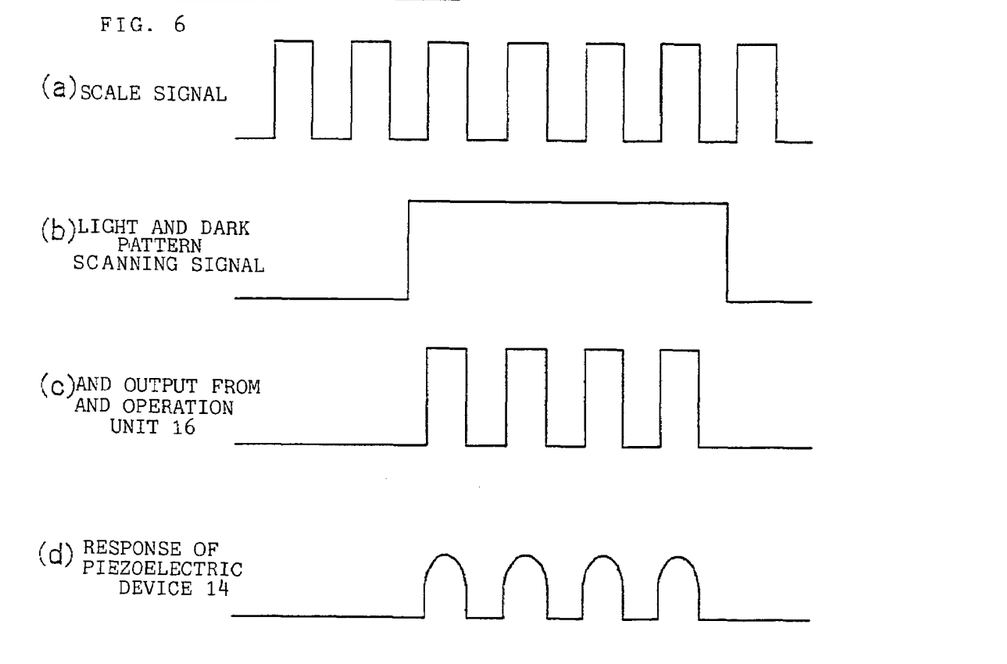
FIG. 6 shows the timing at which the tool in FIG. 2 is driven.

As shown in FIG. 6(*a*), the scale signal output from the linear scale sensor 12 is a pulse signal that depends on the speed of travel of the XY movable member 2. A logical AND operation is performed on this scale signal and the light and dark pattern scanning signal in FIG. 6(*b*) from the light and the dark pattern scanning sensor 9 by the AND operation unit 16 and the resulting AND signal in FIG. 6(*c*) is output from the AND operation unit 16. A logical AND operation is performed on the AND signal output from the AND operation part 16 and the X-axis driving direction signal (which is a positive direction signal) by the AND operation unit 17 and, while the XY movable member 2 moves in the positive X-axis direction, the AND signal (signal shown in FIG. 6(*c*)) from the AND operation unit 16 is output, and the piezoelectric device 14 is driven through the piezoelectric amplifier 18.

The piezoelectric device 14 is driven by a pulse signal with a rectangular waveform, but the response (movement) of the piezoelectric device 14 is actually a reciprocating motion with a smooth convex waveform as shown in FIG. 6(*d*) because of, for example, delays in the response of the piezoelectric device 14 and the piezoelectric amplifier 18. The output of the AND operation unit 17 may be input to the piezoelectric amplifier 18 through a filter so that the waveform of the voltage for driving the piezoelectric device 14 is changed to a smooth convex shape, similar to a sinusoidal half-wave.

Since the driving signal (AND output from the AND operation unit 16) is output to the piezoelectric device 14 at positions specified by the pitch of the linear scale 11, even if the X-axis speed changes, the machining position of the dimples is not affected. Accordingly, dimples are machined consistently at a constant pitch. The machining position of the dimples does not depend on the X-axis speed, so the X-axis speed does not need to be controlled strictly. The light and dark pattern is sufficient for precise high-speed machining of dimples with an exact pitch.

The piezoelectric device 14 has a response speed of several tens of kilohertz, so the piezoelectric device 14 can respond even when the frequency of the signal for driving the tool 8 is high, thereby enabling high-speed machining of dimples. Furthermore, the machining positions, which do not depend on the speed of the XY movable member 2, correspond consistently to the scale signal, and have a constant pitch. Since the piezoelectric device 14 has a response speed of several tens of kilohertz, in theory, 10,000 dimples with a pitch of 0.1 mm can be rapidly machined per second, assuming that the linear axis is driven at a speed of 1 m/sec and the rounded cutting tool is driven to vibrate at a frequency of 10 kHz via the piezoelectric device 14.

Figure 7A:
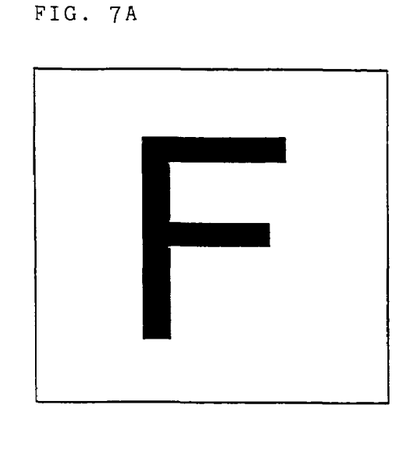
FIGS. 7A and 7B shows a light and dark pattern disposed on a light and dark pattern member and a dimple pattern machined in accordance with the light and dark pattern.
Figure 7B:
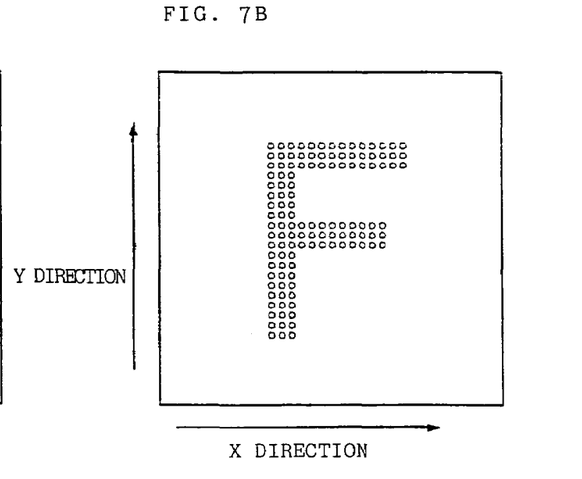

The light and dark pattern disposed on the light and dark pattern member 6 and the dimple pattern machined in accordance with the light and dark pattern will be described with reference to FIGS. 7A and 7B. FIG. 7A shows a two-dimensional light and dark pattern disposed on the light and dark pattern member 6 and FIG. 7B shows the dimple patter machined in accordance with the light and dark pattern.

The XY movable member 2 is driven in the positive X-axis direction at a predetermined speed via the X-axis driving means 3 and the workpiece 5 is machined based on the logical AND of the scanning signal from the light and dark pattern scanning sensor 9 that scans the light and dark pattern and the scale signal from the linear scale sensor 12.

The XY movable member 2 moves in the Y-axis direction while the tool 8 is retracted from the workpiece 5 on the backward X-axis path. The XY movable member 2 is driven in the negative X-axis direction to return to its starting position, and the Y-axis driving means is driven to move the X-axis driving means 3 and the XY movable member 2 in the Y-axis direction by a predetermined pitch. The X-axis driving means 3 then resumes driving of the XY movable member 2in the positive X-axis direction to perform machining. The workpiece 5 is machined by repeating these steps to create a dimple machining pattern on the workpiece 5.

When the XY movable member 2 to which the tool 8 is attached is fed in the Y-axis direction to perform the next machining path in the X direction, the scales on the linear scale are scanned at the same positions as in the previous machining path, so machining is performed at the pitch specified by the scale pitch in the X direction, and is controlled in the Y direction at the Y-axis feed pitch.

As a result, as shown in FIG. 7B, a pattern of machined dimples arranged on an exact lattice, having the same size as the light and dark pattern, can be machined at very high speed. Even when dimples are machined in a complicated pattern, a single light and dark pattern, similar to a simple picture, can be used in place of a large program, eliminating the time that would be required for coding the program.

The pitch (distance between adjacent dimples in dimple machining) in the X-axis direction is based on the signal pitch of the scale, but the machining pitch of the dimples can be magnified by N times (N being an integer equal to or greater than 2) if the scale signal is electrically thinned out by a signal converter that outputs one pulse for every N pulses of the scale signal. The pitch in the X-axis direction can be increased or decreased by thinning out the scale signal with a signal converter as described above, or by changing the machining pitch of the linear scale or the cycle of its on/off pattern.

In addition, the cutting depth to which the cutting means 7 drives the tool 8 depends on the pulse voltage output from the piezoelectric amplifier 18. The cutting depth can accordingly be increased or decreased by adjustment of the gain of the piezoelectric amplifier 18.

Figure 8:
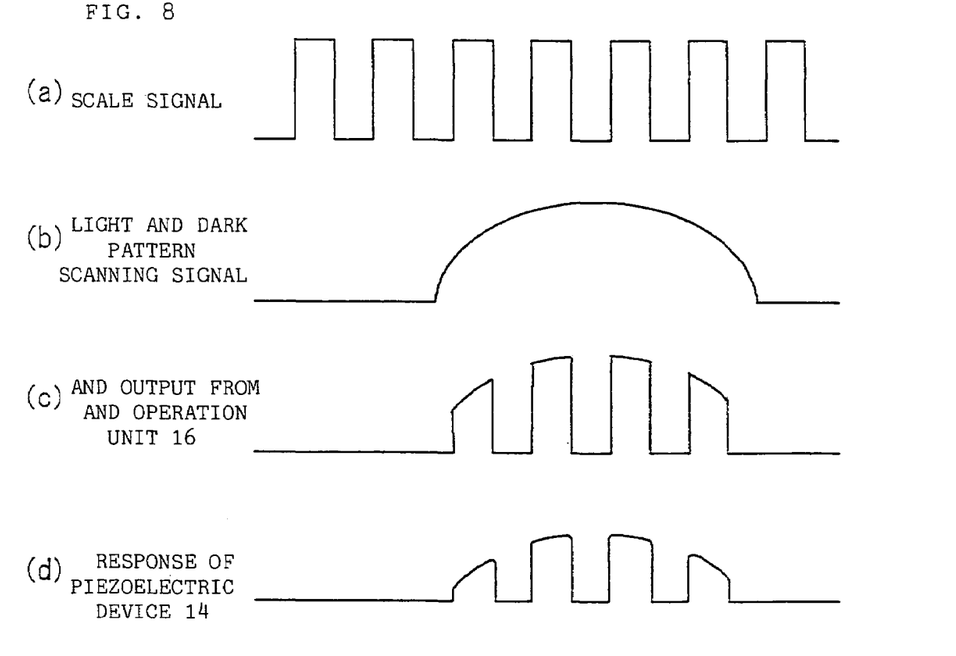
FIG. 8 shows the timing at which the tool is driven when a pattern with a continuous gradation from white to black is used to output an analog pattern scanning signal in accordance with the gradation.

FIG. 8 shows the timing at which the tool is driven when a pattern of continuous gradation is used, instead of a light and dark pattern including only white and black, and an analog light and dark pattern scanning signal is output in accordance with the gradation.

As shown in FIG. 8(*b*), the light and dark pattern scanning sensor 9 outputs an analog light and dark pattern scanning signal with an amplitude corresponding to the brightness gradation of the light and dark pattern. A logical AND operation is performed on the analog scanning signal and the scale signal input by the AND operation unit 16, but the AND operation unit 16 is configured with analog gate circuitry so that an analog scanning signal is output to the AND operation unit 17 while the scale signal (see FIG. 8(*a*)) is in ON-state. The analog gate circuitry has an analog switch that is opened and closed with the scale signal so that a pulse with the waveform shown in FIG. 8(*c*) is output. During movement in the positive X-axis direction, the AND operation unit 17 outputs the AND signal output from the AND operation unit 16 to the piezoelectric amplifier 18 to drive the piezoelectric device 14.

Figure 5:
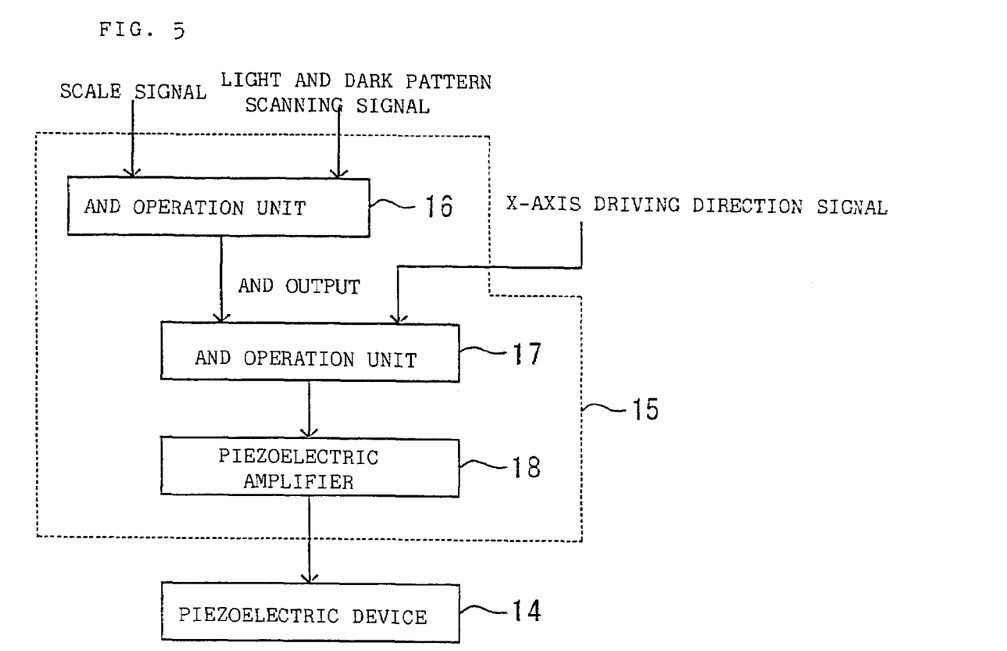
FIG. 5 is a block diagram illustrating a first example of a cutting means driving section for driving the cutting means.

When the piezoelectric device 14 is driven by the cutting means driving section 15 in FIG. 5, the stroke of the tool 8 in the Z-axis direction caused by the piezoelectric device 14 depends on the gain of the piezoelectric amplifier 18 and the amplitude (voltage) of the light and dark pattern signal. However, the time required for the piezoelectric device 14 to operate once depends on the width of the scale signal, so it is difficult to adjust the operation time (pulse width indicated as piezoelectric device response in FIG. 6(*d*) and FIG. 8(*d*)) of the tool 8 by adjusting the driving of the piezoelectric device 14.

A second example of the cutting means driving section for driving the cutting means will be described below.

The cutting means driving section in this example uses the result (AND output) of the logical AND operation performed by the AND operation unit 16 on the scanning signal from the light and dark pattern scanning sensor 9 that scans the light and dark pattern and the scale signals from the linear scale sensor 12, as a trigger signal, to generate a machining pulse, and arbitrarily sets the operation time and stroke of the tool 8 by adjusting the driving of the piezoelectric device 14.

The second example of the cutting means driving section for driving the cutting means will be described with reference to the main element block diagram in FIG. 9.

The differences between the cutting means driving section 19 in the second example and the cutting means driving section 15 in the first example in FIG. 5 are that the cutting means driving section 19 has a machining pulse generator 20 that uses the AND output of the AND operation unit 16 as a trigger to generate a convex (sinusoidal half-wave) machining pulse, and that the AND operation unit 17 includes analog gate circuitry or the like.

The AND operation unit 16 performs a logical AND on the scanning signal from the light and dark pattern scanning sensor 9 and a pulse signal (scale signal) from the pulse generation means 10 and outputs the result to the machining pulse generator 20.

The machining pulse generator 20 is triggered by a pulse output from the AND operation unit 16 and includes pulse generation circuitry that generates convex (sinusoidal half-wave) shape machining pulses. A manual input means that adjusts the pulse width and the amplitude of the machining pulses is provided. Alternatively, means for automatically adjusting the pulse width of the machining pulses is provided to deliver an X direction feed axis speed signal to the machining pulse generator 20, and the machining pulse generator 20 automatically adjusts the pulse width in accordance with the speed signal. For example, the pulse width may be reduced as the speed increases and increased as the speed decreases. In addition, when the amplitude of the machining pulse is automatically adjusted, the analog scanning signal of the light and dark pattern may be input to the machining pulse generator 20 as shown by the dashed arrow in FIG. 9 and the amplitude of the pulse may be set by the machining pulse generator 20 in accordance with the amplitude (voltage) of the scanning signal of the light and dark pattern.

The convex machining pulses generated by the machining pulse generator 20 are delivered to the AND operation unit 17. A driving signal for the XY direction driving member 2 is also delivered to the AND operation unit 17. In a machining apparatus that uses a cutting means driven by the cutting means driving section in FIG. 9, as described above, the workpiece 5 is machined when the XY direction driving member 2 moves in the positive X-axis direction (on the forward path). While a signal generated when the XY direction driving member 2 moves in the positive X-axis direction is input to the AND operation unit 17, the convex machining pulses generated in the machining pulse generator 20 are output and delivered to the piezoelectric amplifier 18, and the piezoelectric amplifier 18 drives the piezoelectric device 14. During movement in the negative X-axis direction, the AND operation unit 17 blocks the convex machining pulses from the machining pulse generator 20 so that outputting of machining pulses is stopped.

The timing at which the tool is driven by the cutting means driving section 19 in FIG. 9 will be described with reference to FIG. 10.

Figure 10:
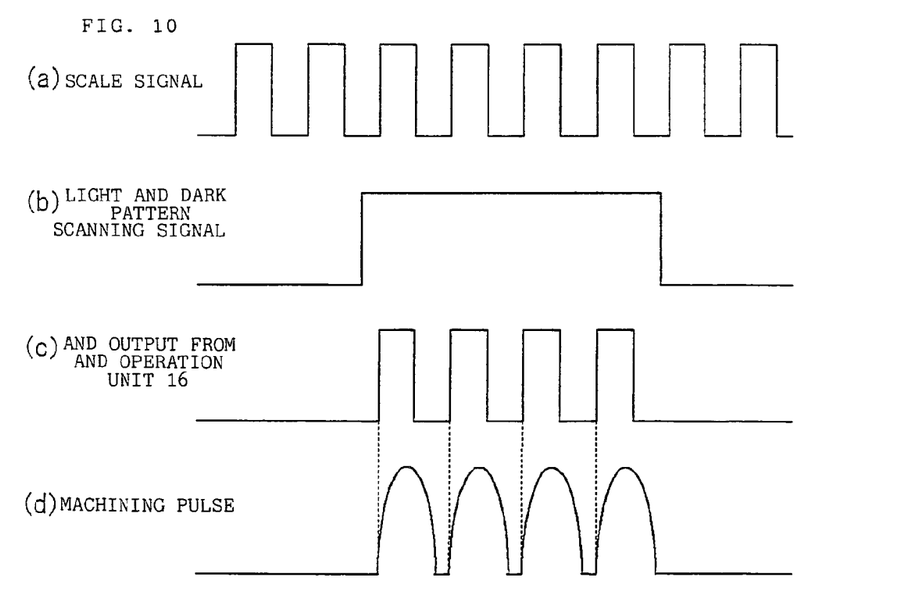
FIG. 10 shows the timing at which the tool is driven by the cutting means driving section in FIG. 9.

The machining pulse generator 20 outputs convex machining pulses (see (d) in FIG. 10) when triggered by the pulse output (see (c) in FIG. 10) from the AND operation unit 16 that performs a logical AND operation on the scale signal (see (a) in FIG. 10) and the light and dark pattern scanning signal (see (b) in FIG. 10). The driving signal for the piezoelectric device 14 is output at positions specified by the scale pitch, so the position at which a dimple is machined is not affected if the speed of the X-axis changes. The width of the convex machining pulse is adjusted by the machining pulse generator 20, so the width of the convex machining pulses can be arbitrarily set within one cycle of the scale signal regardless of the pulse width of the scale signal.

Figure 11:
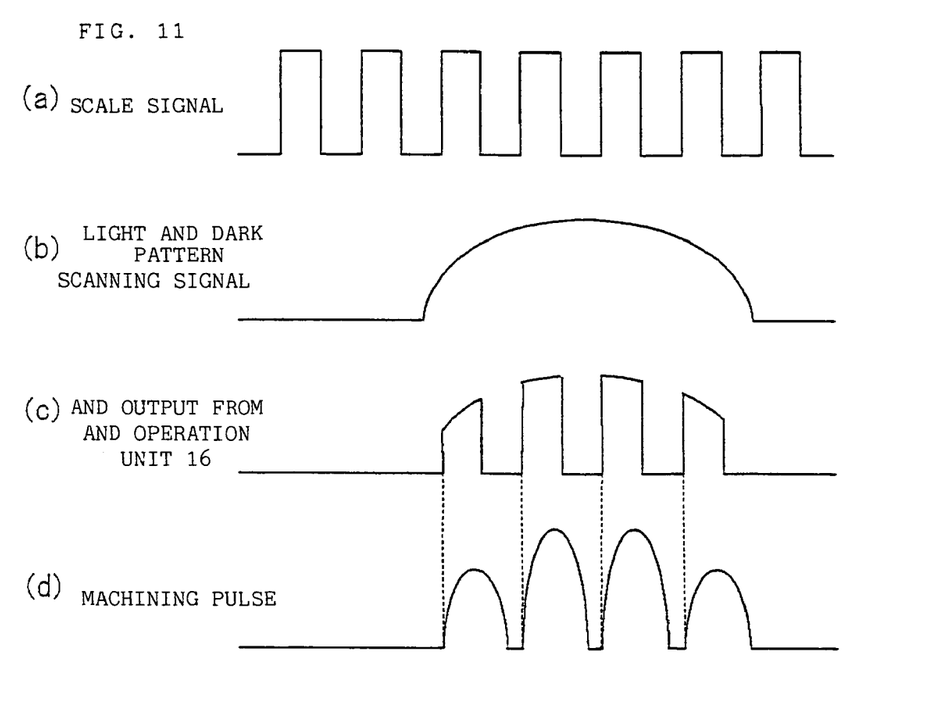
FIG. 11 shows the timing at which the tool is driven when a pattern with grayscale gradation is used to output an analog pattern scanning signal in accordance with the gradation.

FIG. 11 shows the timing at which the tool is driven when a grayscale gradation pattern is used instead of a light and dark pattern including only white and black, and an analog pattern scanning signal is output in accordance with the gradation.

Figure 9:
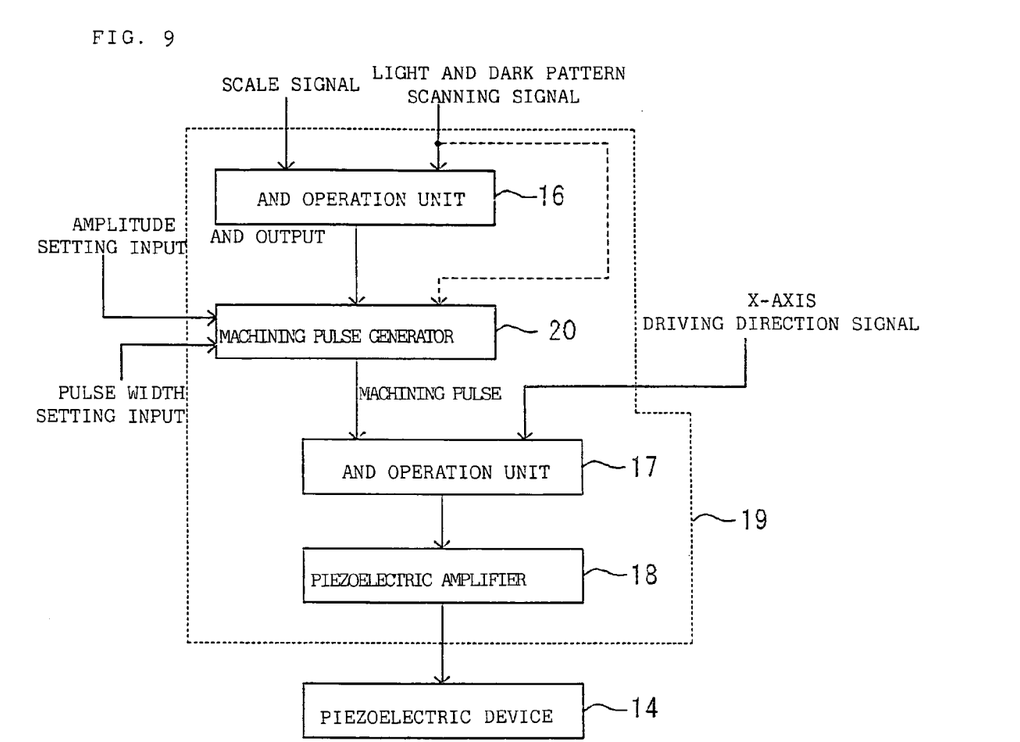
FIG. 9 is a block diagram showing the main elements in a second example of the cutting means driving section for driving the cutting means.

In this case, the machining pulse generator 20 generates pulses corresponding to the intensity of the grayscale gradation of the light and dark pattern, and the scanning signal of the light and dark pattern is input to the machining pulse generator 20 as shown by the dotted line in FIG. 9, so that when generating pulses, the machining pulse generator 20 can change the amplitude of the convex pulses in proportion to the amplitude of the scanning signal (analog signal) from the light and dark pattern scanning sensor 9 to change the depth (size) of dimples.

Figure 12A:
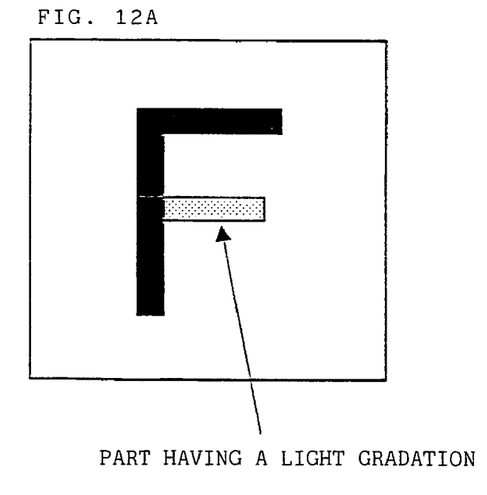
FIGS. 12A and 12B show an example of a partially faint light and dark pattern and exemplary dimples machined by making part of the light and dark pattern faint.
Figure 12B:
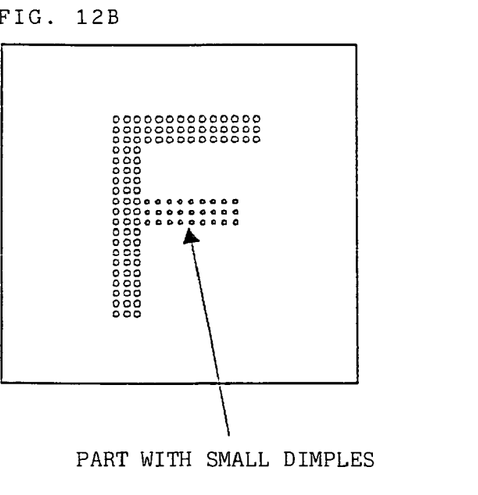

FIG. 12A shows an example of a light and dark pattern in which the gradation is partially light gray and FIG. 12B shows an example of machined dimples with different depths (sizes) corresponding to the intensity of the light and dark pattern.

In an area where the gradation of the light and dark pattern is light gray, the amplitude of the convex pulses and the depth of the dimples are less (the dimples are smaller) than in an area where the gradation of the light and dark pattern is unchanged. Accordingly, the depth (size) of dimples arranged in exact positions can be changed by using a light and dark pattern instead of a machining program.

In the embodiments described above, as the pulse generation means that generates a pulse each time the first member moves a certain amount relative to the second member, the linear scale 11, on which scales are marked at a constant pitch, is disposed on the Y movable member 4 (the second member) in parallel with the direction of movement (X-axis direction) of the XY movable member 2, and the linear scale sensor 12, which outputs a scale signal pulse each time a scale on the linear scale 11 is scanned, is disposed on the upper surface of the XY movable member 2. However, in place of this structure, an encoder already disposed on a feed axis or a motor axis of the X-axis linear driving means may also be used as the pulse generation means.

A third linear driving means (Z-axis linear driving means) that moves the Y movable member 4 in a third linear direction (Z-axis direction) in the tool cutting depth direction may be provided. In this structure, if the Y movable member 4 is moved in the Z-axis direction by the Z-axis linear driving means, the XY movable member 2 is moved in the Z-axis direction, so the position of the tool 8 can changed according to the thickness of the workpiece 5.

In the embodiments described above, the XY movable member 2 on which the tool 8, the light and dark pattern scanning sensor 9, and the linear scale sensor are disposed is arranged so as to be movable in the X-axis and Y-axis directions with respect to the base 1 to which the workpiece 5 and the light and dark pattern member 6 are attached. Alternatively, the workpiece 5, the light and dark pattern member 6, and the linear scale 11 may be fixed to a table movable in the X-axis and Y-axis directions by an X-axis motor and a Y-axis motor, and the tool 8, the light and dark pattern scanning sensor 9, and the linear scale 11 may be attached to and XY movable member 2 that is movable by a Z-axis motor only in the Z-axis direction, orthogonal to the X-axis and Y-axis directions.

The invention claimed is:

1. A machining apparatus comprising:
a linear driving means for linearly moving a first member in a first direction relative to a second member placed opposite to the first member; and
a pulse generation means for generating a pulse each time the first member moves a certain amount relative to the second member,
wherein an area for placing a workpiece is provided on the first or second member, and a light and dark patterned member having a light and dark pattern indicating machining information is placed on the first or second member,
a light and dark pattern scanning sensor for scanning the light and dark pattern and outputting a scanning signal, a tool for machining the workpiece, a cutting means for making the tool cut into the workpiece in a direction orthogonal to the first direction, and a cutting means driving section for driving the cutting means are provided on the second or first member, and
the cutting means driving section machines the workpiece by having the cutting means operate the tool according to output of a logical AND operation performed on the scanning signal from the light and dark pattern scanning sensor and pulses from the pulse generation means while the first member moves relative to the second member.

2. The machining apparatus according to claim 1, wherein the cutting means driving section includes a machining pulse generator for generating convex machining pulses, makes the machining pulse generator generate the machining pulses in accordance with the output of the logical AND operation, and performs machining by having the cutting means vary a cutting depth of the tool according to the machining pulses.

3. The machining apparatus according to claim 2, wherein the machining pulse generator has means for adjusting the pulse width of the machining pulses to be generated manually or according to a feed rate of the first member.

4. The machining apparatus according to claim 1, wherein the cutting means includes a piezoelectric device and moves the tool in the cutting depth direction by expanding or compressing the piezoelectric device according to a magnitude of an applied voltage.

5. The machining apparatus according to claim 1, wherein the machining performed by the cutting means is dimple machining.

6. The machining apparatus according to claim 1, wherein the first member performs a reciprocating motion in the first direction with respect to the second member, the tool machines the workpiece while the first member moves on a forward path, and the tool retracts from the workpiece while the first member moves on a backward path.

7. The machining apparatus according to claim 1, further comprising a second linear driving means for moving the first member relative to the second member in a second direction orthogonal to both the first direction and the cutting depth direction of the tool.

8. The machining apparatus according to claim 7, further comprising a third linear driving means for moving the first member relative to the second member in a third linear direction aligned with the cutting depth direction of the tool.

9. The machining apparatus according to claim 1, wherein the pulse generation means has a linear scale marked with scales spaced at a constant pitch and a linear scale sensor that outputs a pulse each time a scale the linear scale is scanned, the linear scale being disposed on the first or second member, the linear scale sensor being disposed on the second or first member.

10. The machining apparatus according to claim 1, wherein the pulse generation means is an encoder disposed on a feed axis of the linear driving means.

* * * * *

UNITED STATES PATENT AND TRADEMARK OFFICE
CERTIFICATE OF CORRECTION

PATENT NO. : 7,284,937 B2　　　　　　　　　　　　　　　　　　　　　　Page 1 of 1
APPLICATION NO. : 11/524399
DATED : October 23, 2007
INVENTOR(S) : Tomohiko Kawai et al.

It is certified that error appears in the above-identified patent and that said Letters Patent is hereby corrected as shown below:

Column 2, Line 44, after "voltage" insert --.--.

Column 5, Line 4, change "direction,." to --direction.--.

Column 6, Line 38, change "6(c) )" to --6(c))--.

Column 7, Line 30, change "2in" to --2 in--.

Column 10, Line 37, change "and" to --an--.

Signed and Sealed this

Thirteenth Day of May, 2008

JON W. DUDAS
*Director of the United States Patent and Trademark Office*